United States Patent [19]

Lewis et al.

[11] 3,877,719

[45] Apr. 15, 1975

[54] INFLATOR-CONNECTOR FOR INFLATABLE VEHICLE SAFETY BELTS

[75] Inventors: Donald J. Lewis, Troy; Richard W. Lucore, Rochester, both of N.Y.

[73] Assignee: Allied Chemical Corporation, New York, N.Y.

[22] Filed: Nov. 24, 1972

[21] Appl. No.: 309,404

[52] U.S. Cl. .............. 280/150 AB; 9/316; 137/231; 280/150 SB

[51] Int. Cl. ........................................... B60r 21/08

[58] Field of Search .... 280/150 AB, 150 SB; 9/316, 9/329, 336; 297/386, 384, 389, 385; 137/231, 223

[56] References Cited

UNITED STATES PATENTS

| | | | |
|---|---|---|---|
| 2,084,636 | 6/1937 | Fromm | 9/316 |
| 2,864,437 | 12/1958 | Spring | 297/386 |
| 2,970,326 | 2/1961 | Keefe | 9/314 |
| 3,227,490 | 1/1966 | Svensson | 297/389 |
| 3,306,662 | 2/1967 | Finnigan | 280/150 SB |
| 3,314,719 | 4/1967 | Johnson | 280/150 SB |
| 3,348,881 | 10/1967 | Weman | 280/150 SB |
| 3,608,114 | 9/1971 | Middleton et al. | 9/314 |
| 3,608,962 | 9/1971 | Knecht | 297/389 |
| 3,630,472 | 12/1971 | Axenborg | 280/150 B |
| 3,682,498 | 8/1972 | Rutzki | 280/150 SB |
| 3,706,463 | 12/1972 | Lipkin | 280/150 AB |
| 3,791,670 | 2/1974 | Lucore et al. | 280/150 AB |

*Primary Examiner*—David Schonberg
*Assistant Examiner*—John P. Silverstrim
*Attorney, Agent, or Firm*—Jonathan Plaut; Ernest D. Buff

[57] ABSTRACT

In a vehicle safety system employing inflatable seat belts, the combination of a manifold-connector for readily engaging the seat belts to a source of pressurized gas.

25 Claims, 19 Drawing Figures

69
1
68
10
67
70
66
9
62

1
2
3
4

5
6
7

1
2
4
5

10
12
13
16
19
24

7
7
7
5
2
1
37
37

1
2
4
37
36
25
36
37

38
65
25

38

38
25

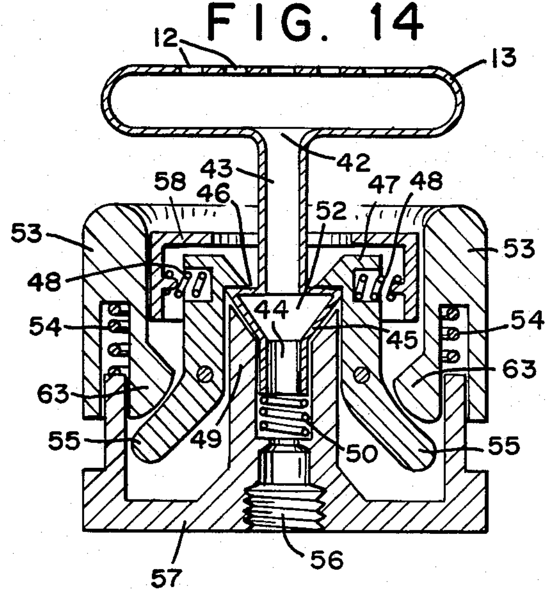
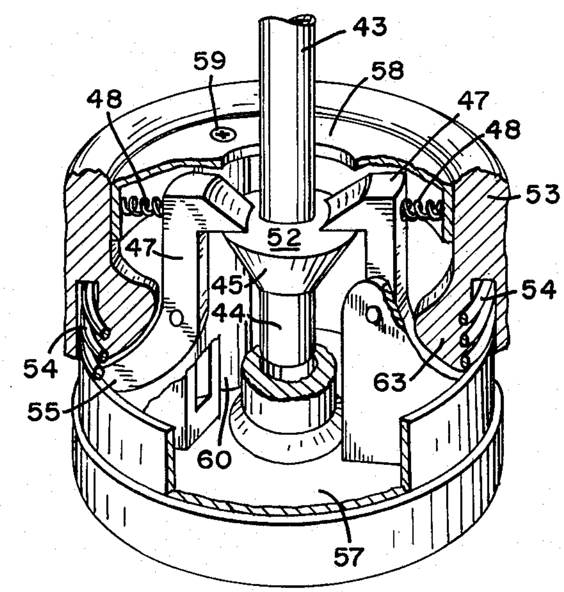
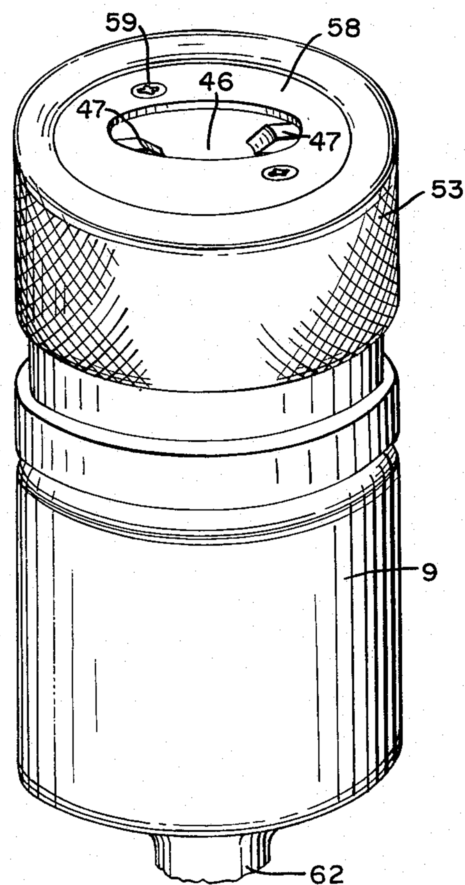
FIG. 16

84
7
5

71
82
43
52
45
44

84

5
7
64
43
82
43
52
45
52
45
44
44

INFLATOR-CONNECTOR FOR INFLATABLE VEHICLE SAFETY BELTS

BACKGROUND OF THE INVENTION

1. Field of the Invention

This invention relates to safety seat belt and harness assemblies of the type wherein the belts, portions thereof, or attachments thereto are inflatable, to provide the wearer with restraint over a greater area of his body under crash conditions.

2. Description of the Prior Art

Seat belt and harness assemblies have long been used which buckle over the lap and diagonally across the chest of the wearer to restrain him in the event of a crash or roll-over. More recently, air bags have been suggested which inflate in front of the occupant of a vehicle with sufficient rapidity as to protect him from striking the vehicle structure if the vehicle is involved in a collision. Still more recently it has been suggested to combine the best features of both systems by providing a safety seat belt harness wherein the belt itself, or air bags attached thereto are inflated as a result of the triggering action of a sensing element. U.S. Pat. No. 3,430,979 to Terry et al. provides air bags attached to a seat belt which are inflated in response to a signal from a crash sensor, and U.S. Pat. No. 3,682,498 to Rutzki conveys pressurized gas through a tubular webbing to an inflatable device, the flow of gas being triggered by the pressure against the belt and harness resulting from the forces which develop during a collision.

SUMMARY OF THE INVENTION

The present invention is directed to a combination vehicle safety harness assembly and inflator-connector. The assembly comprises:

a. inflatable lap and shoulder belts having one end of both belts interconnected and terminating in a rigid, unitary tubular coupling member constructed as a single rigid hollow unit having an inlet opening for the passage of gas, and an outlet connected to the interconnecting seat belts;

b. a rigid cooperating connecting member anchored to the vehicle, having conduit means therethrough and adapted to accept the tubular coupling member in substantially gas tight engagement, with the outlet of the conduit means in substantial alignment with the inlet opening of the coupling member;

c. a source of gas in communication with the inlet of the conduit; and d. sensing means responsive to preselected conditions to initiate the flow of gas through the engaged connector and coupler to simultaneously inflate the interconnecting inflatable belts.

The combination of the tubular coupling member and the rigid cooperating connecting member is herein referred to as an "inflator-connector".

In a preferred embodiment the coupler comprises a tubular structure which is sealed into an inflatable seat belt, or into a conduit connected to an inflatable portion of a seat belt. Pressurized gas admitted to the tube escapes through one or more openings in its side wall into the inflatable seat belt, or into the aforementioned conduit. Preferably, the seat belt, which in its inflated condition has a circumference of at least about 16 inches, is pressed flat, and then folded in a longitudinal W or N fold, and held together to form a flat belt by stitching with thread having a low tensile strength (so called "rotten thread"), by an adhesive, by enclosure in a flexible, readily rupturable envelope, or by a combination of two or more of these methods. A suitable conduit for conveying gas to inflatable portions of a seat belt may comprise a flexible belt having a multiplicity of parallel conduits throughout its length, and if desired, strengthened by having strong cord embedded longitudinally in its structure, by enclosing it in a strong fabric envelope, by facing it with "webbing", or by employing a combination of two or more of these methods.

The material of construction for the tubular coupler is not critical. It may be fabricated of metal, or of a polymeric material, such as polyvinyl chloride, polypropylene, nylon, Teflon or other similar materials. The interior of the coupler is smooth, and preferably cylindrical or tapered. The conduit described is preferably fabricated of flexible polymeric material, such as polyvinyl chloride, polypropylene, or compositions of similar polymers or copolymers. Such conduit can be used to fabricate the tubular coupler, thus becoming a distributor, with one leg leading to an inflatable seat belt, and one to an inflatable lap belt. With this method of fabrication, the several conduits should have openings, or be channeled on the inside surface of the tubular coupler formed, for the passage of air to the inflatable portions of the belts.

These tubular couplers may be open at one or both ends, or they may be closed at both ends and have a mid-point connection for the admission of pressurized gas.

The rigid cooperating connecting member of the present invention may take one of several related forms. In a preferred embodiment, it comprises, in part, a tubular manifold sized to slip within the tubular coupling member in substantially gas-tight engagement, whereby pressurized gas from the connecting member can flow into the tubular coupling member and discharge through one or more openings in the wall of the coupling member simultaneously into the lap and shoulder section of an inflatable safety belt harness. The tubular manifold is in communication with a source of pressurized gas, and when the tubular coupler is slipped over the manifold, openings in the manifold are substantially in alignment with openings in the coupler, so that gas entering the manifold will pass readily into the coupler, and thence to the inflatable belt to which it is attached, without appreciable loss of gas at the point of coupling. Both coupler and manifold may be cylindrical or have an oval or other cross section, providing they are contiguous one with the other. Preferably they are cylindrical or more desirably, somewhat tapered, to provide good seating, a degree of rotation about the manifold, ease of insertion, and rapid release and ejection of the coupler.

The manifold is but a portion of the connecting member which is anchored to the vehicle, and is either integrated with a source of pressurized gas or connected to such a source by conduit. In the preferred embodiment, means for locking and releasing the coupler from the connecting member is provided.

In another embodiment the coupler is external to the inflatable belt. It may have one or more nipples sealed into the belt, or alternately, it may terminate in a sparger which is sealed within the belt. In the latter modification, the opposite end of the coupling member is sized to slip within a portion of the gas outlet of the rigid cooperating connecting member in substantially gas tight engagement. Furthermore, it has on its tubular structure a point of enlargement, or a catch, for latching engagement with cooperating biased latches in the anchored connecting member, whereby the coupler may be pressed into the connecting member for latching engagement therewith, and for communication with the source of pressurized gas. The coupler may be readily disengaged and at least partially ejected from its seat in the connecting member.

In still another embodiment the tubular coupling member is in substantially permanent engagement with the rigid cooperating connecting member, and said connecting member comprises a detachable first section containing the manifold and a second section including a source of gas or a connection thereto. This connecting member is anchored to the vehicle. Means are provided for locking the first section with the second section, thereby anchoring the complete inflator-connector to the vehicle and coupling the sections of the inflator-connector to thus permit the flow of gas from the source to the inflatable belt to which the coupling member is attached.

In the case of all of the embodiments of the present invention, the ends of the seat belts opposite those attached to the connecting member may be anchored directly to the vehicle, or one or both may be attached to seat belt retractors of the type which lock the belt in response to a high rate of change of acceleration, said retractors being anchored to the vehicle. The gas employed in inflating the seat belts is released in response to predetermined forces or effects which develop under crash or emergency conditions. These might be the crushing of a tube, the sudden deceleration or acceleration of the vehicle, sudden acceleration of a seat belt reel, etc. Such stimuli cause the instant release of pressurized gas into the system. Not only do the inflated belts provide greater surface contact with the wearer at the moment of impact, but the shortening effect restrains him tightly in his seat at the moment his body, moving at a relatively high velocity, would otherwise continue to move forward with respect to the vehicle's structure.

Objects and attendant advantages of the present invention will be readily appreciated as the same become better understood by reference to the following detailed description when considered in connection with the accompanying drawings:

DESCRIPTION OF THE DRAWINGS AND THE PREFERRED EMBODIMENTS

This description is directed to the accompanying drawings wherein like reference characters refer to like parts throughout the several views.

FIG. 1 is a perspective drawing of a tubular coupling member or "coupler" adapted for attachment to one or more inflatable seat belts, for coupling the belts to a source of pressurized gas with which the belts may be inflated.

FIG. 2 is a perspective view representing a section of inflatable seat belt having a flexible nipple for attachment to the tubular coupler of FIG. 1. The nipple is set at an angle with respect to the belt in the illustration. The angle may be selected to achieve the best disposition of each length of inflatable belt, when the gas is to be introduced at an intermediate point in a continuous length of belting, thus providing one portion of the total length to serve as a shoulder belt, and one to serve as a lap belt.

FIG. 3 is a perspective view representing the tubular coupler of FIG. 1 attached to the inflatable seat belt of FIG. 2, so that two legs of belting are simultaneously inflated, one serving as a shoulder belt, and one as a lap belt.

FIG. 4 is a perspective break-away drawing of a cooperating rigid connecting member adapted for accepting a tubular coupler, such as that depicted in FIG. 1, in locking engagement, so that a flow of pressurized gas in the connecting member passes into the tubular coupler, thence to the inflatable belt or belts attached thereto. The connecting member of FIG. 4 is also adapted for anchoring to the vehicle in which it is to be used, and contains, or is attached to, the source of pressurized gas. A sensing element for releasing the gas is diagrammatically indicated.

FIG. 4*a* is a perspective break-away drawing representing a portion of the connecting member of FIG. 4 connected to a seat belt associated with an inertia responsive seat belt retractor, the retractor being adapted for anchoring to the vehicle.

Figure 1:
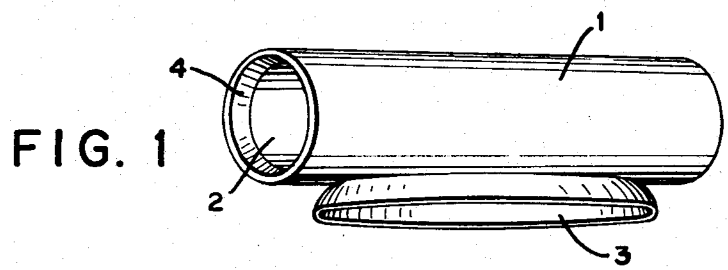
Figure 3:
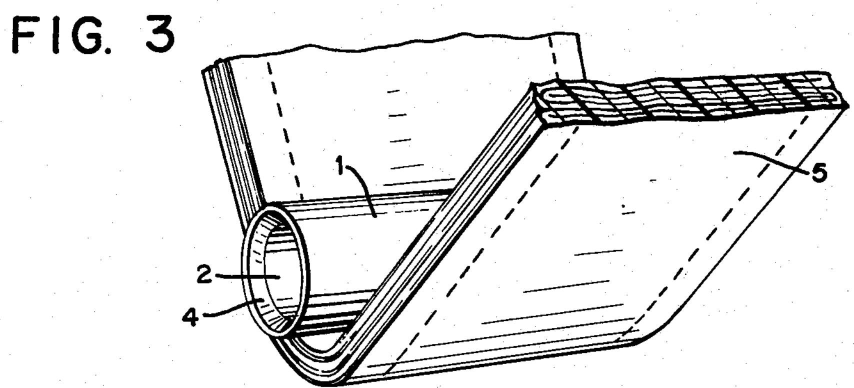
Figure 6:
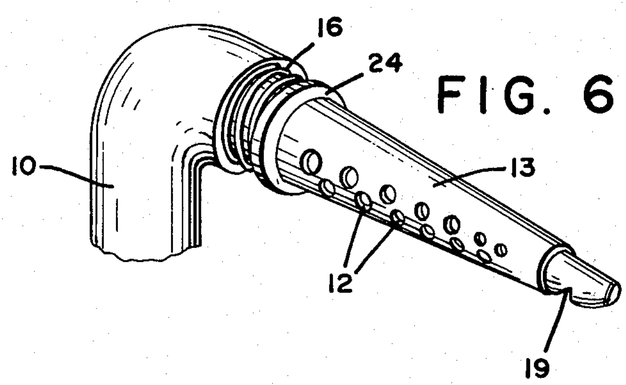
FIG. 6 is a perspective drawing illustrating a modification of the manifold of the connecting member of FIGS. 4 and 5, wherein the manifold is tapered.
Figure 5:
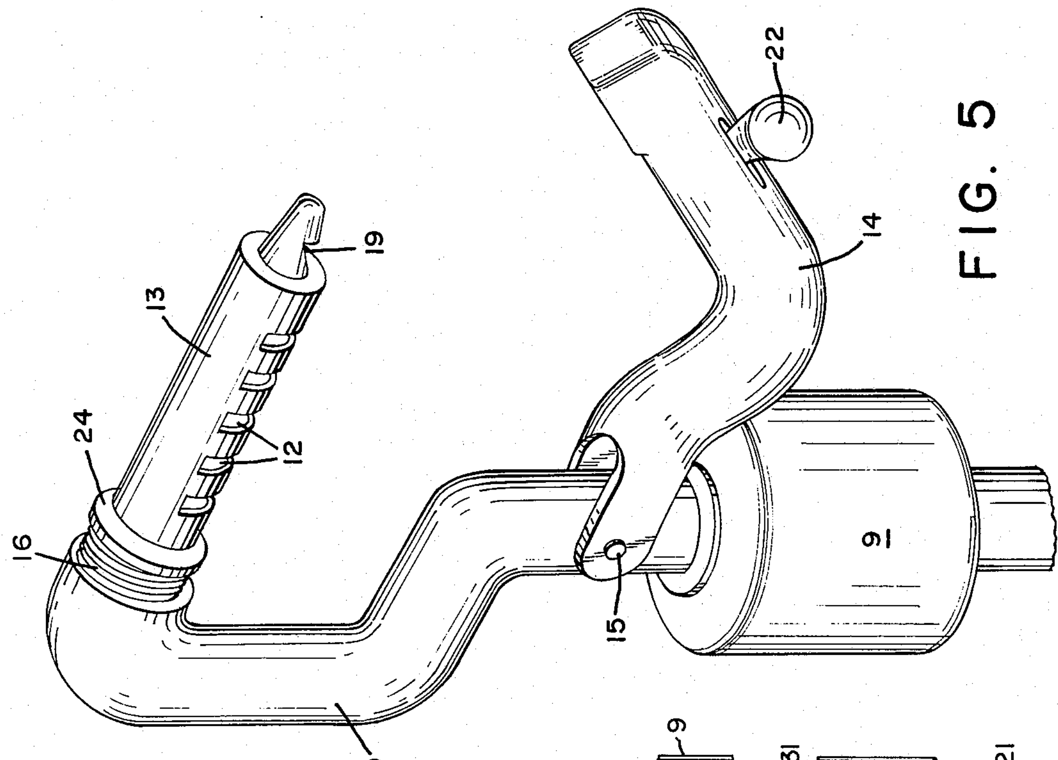
FIG. 5 is a perspective drawing of the connecting member of FIG. 4 shown in the open position, in readiness for acceptance of the coupler of FIGS. 1 and 3.
Figure 4A:
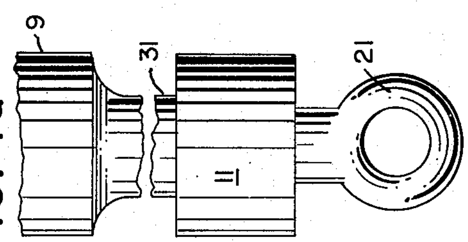
Figure 4:
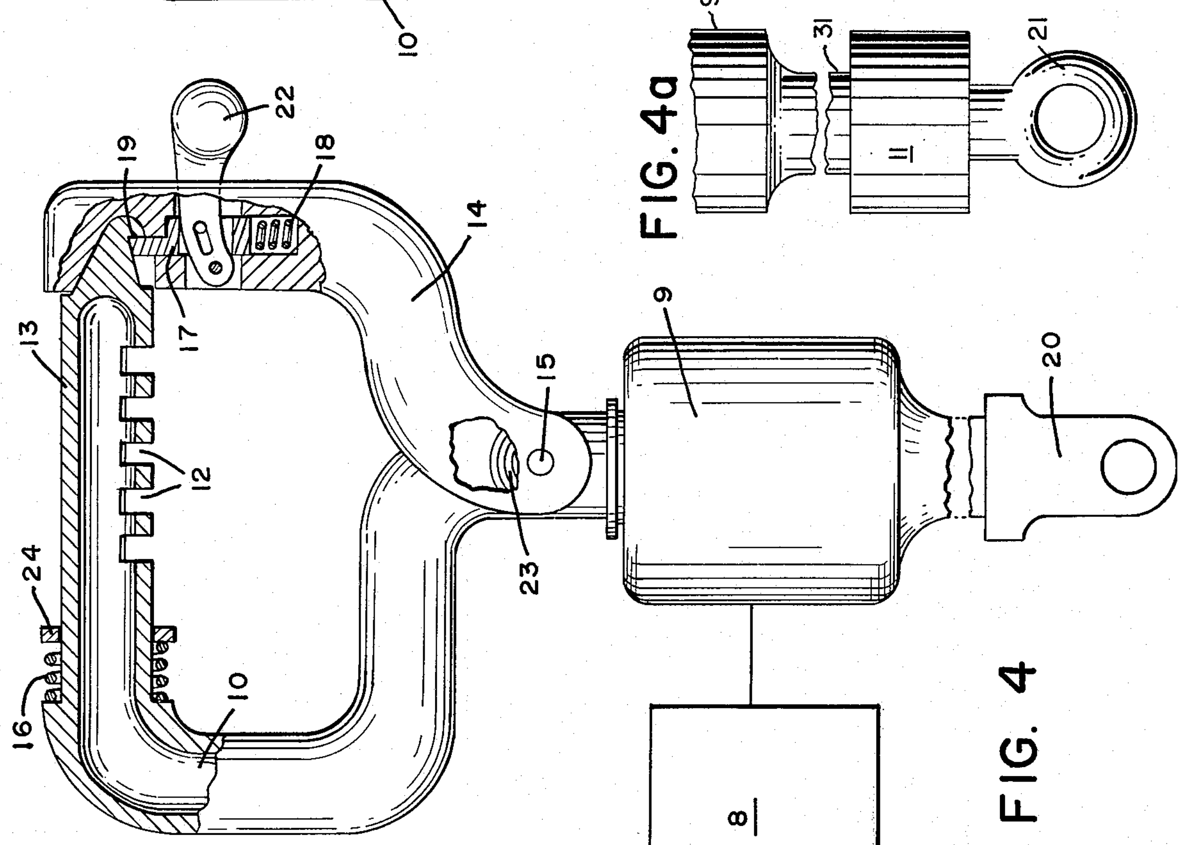
Figure 7:
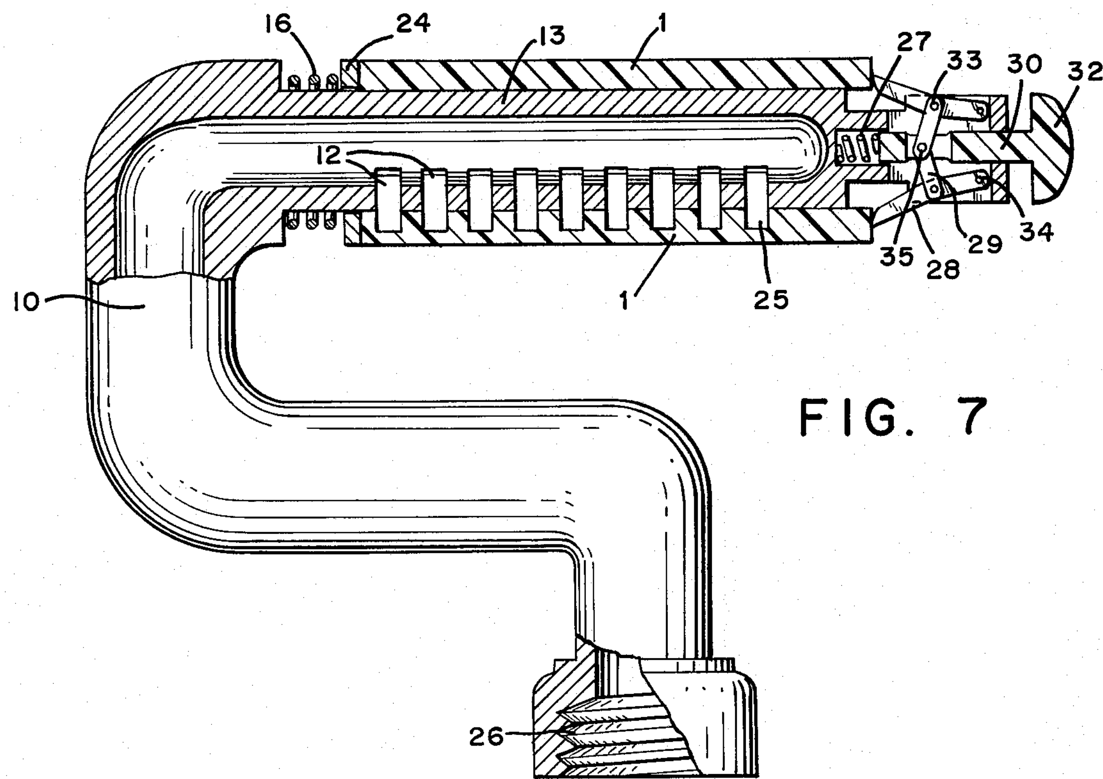

FIG. 7 is a perspective break-away drawing illustrating another modification of the manifold of the connecting member of FIGS. 4 and 5, wherein locking means for engaging the coupler of FIGS. 1 and 3 is included at the terminus of the manifold, thus eliminating the need for a moveable locking arm as shown in the case of the connecting members of FIGS. 4, 5 and 6.

Figure 8:
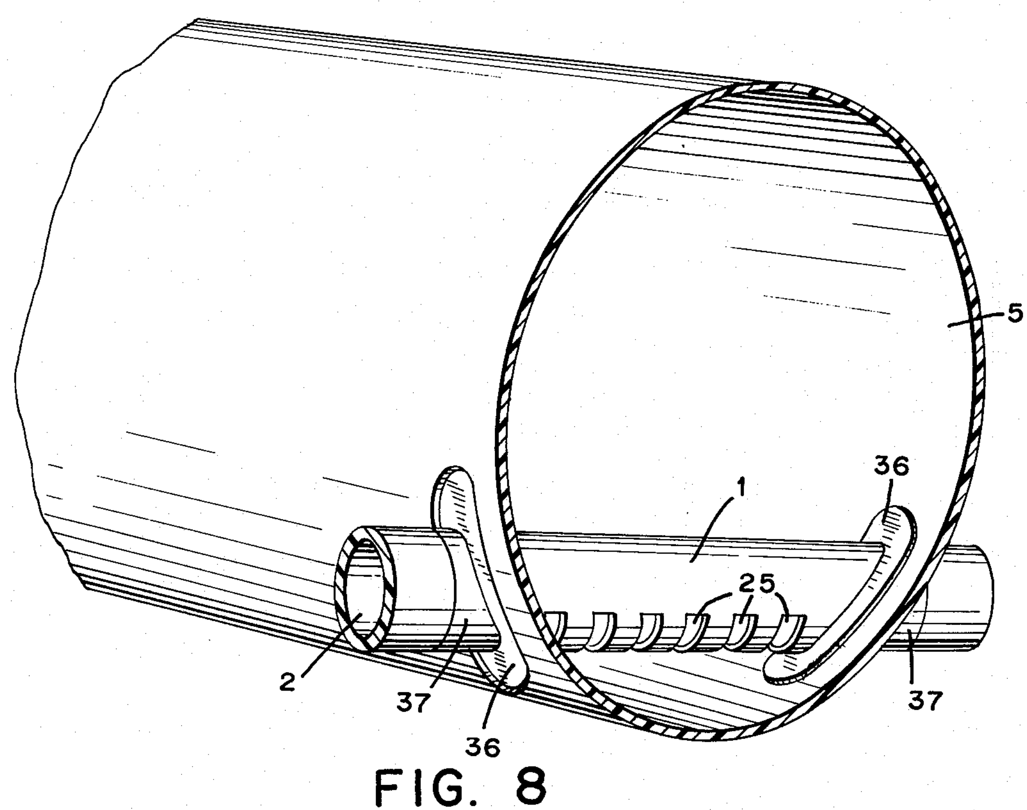

FIG. 8 is a perspective drawing of a portion of an inflatable seat belt in its inflated condition, with a coupler, differing somewhat from that of FIG. 1, connected to and extending through a portion of the belting. The coupler is shown as passing through two flexible nipples sealed into the belt.

Figure 9:
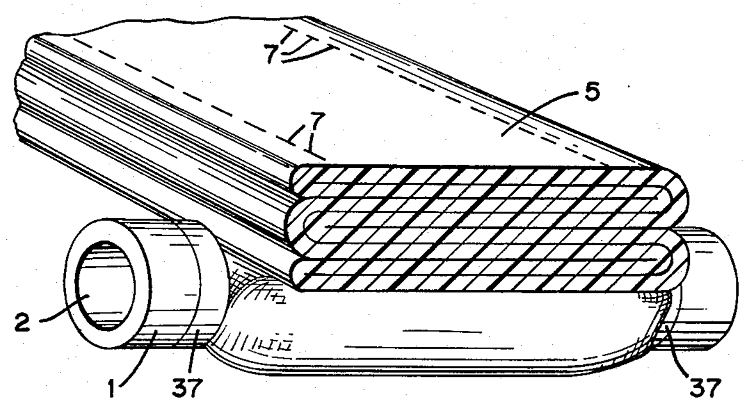

FIG. 9 is a perspective drawing of a portion of a folded and stitched inflatable seat belt, and represents the same arrangement as shown in FIG. 8, before inflation of the seat belt.

Figure 10:
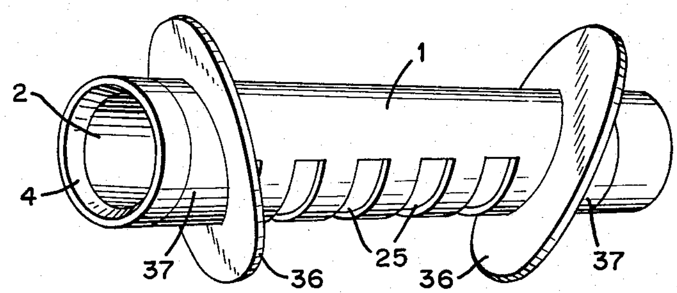

FIG. 10 is a perspective drawing of a coupler with flexible flanges for sealed connection to an inflatable seat belt, said belt to be inflated by pressurized gas escaping from the openings in the coupler between the flanges. This coupler differs from that of FIGS. 8 and 9 in that it is gently tapered, and has a flared opening for easy engagement with a correspondingly tapered manifold.

Figure 11:
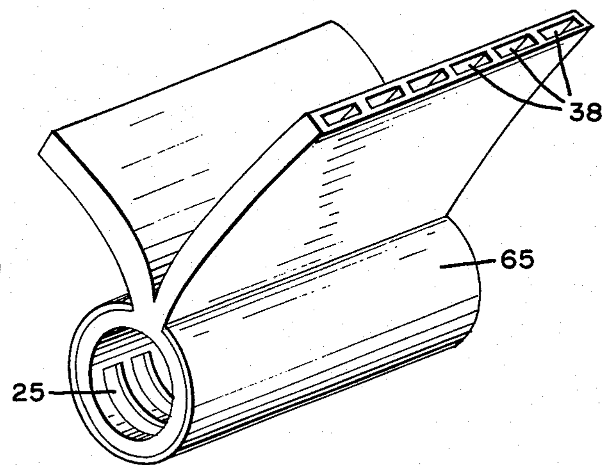

FIG. 11 is a perspective drawing of a coupler integrated with multiple conduit means for conducting gas from a manifold such as that of FIGS. 4, 5 or 7, to inflatable safety belt sections attached thereto at selected distances from the coupler.

Figure 12:
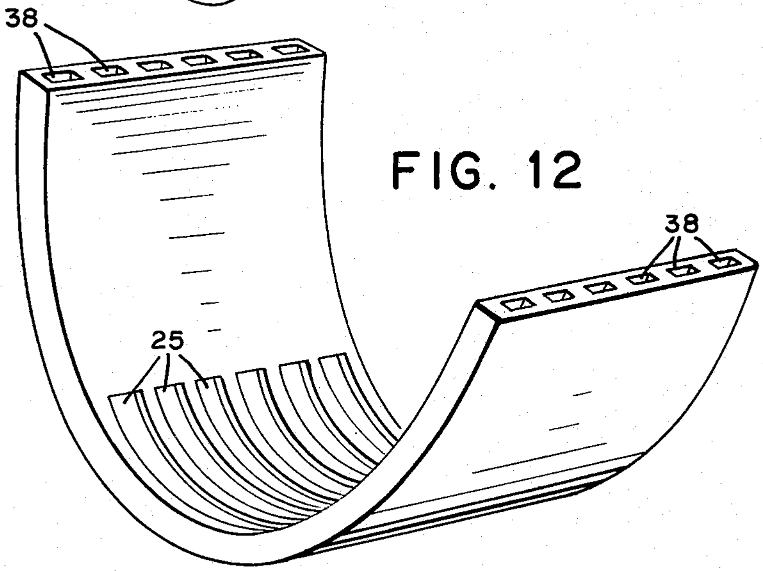

FIG. 12 is a perspective drawing of a section of flexible belting containing a multiplicity of conduits, and having a section wherein the conduits are opened to form channels on one face of the belting. Such belting, preferably composed of a flexible polymeric substance, can be employed in fabricating the structure of FIG.

11, so that the channels communicate with the openings in the manifold to be inserted into the tubular coupler formed, as in FIG. 11. Pressurized gas can thus be conducted through the flexible belting to inflatable belts attached thereto.

Figure 13:
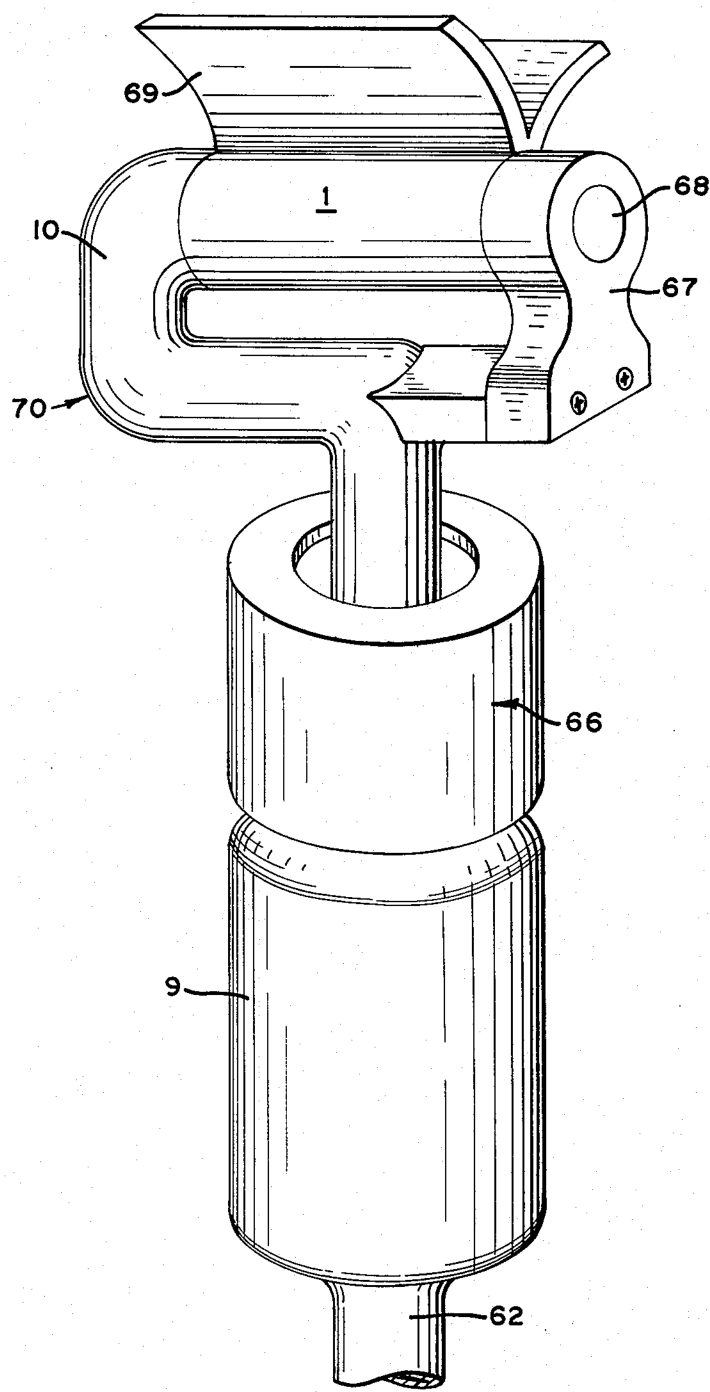

FIG. 13 is a perspective drawing illustrating another modification of the inflator-connector wherein engagement of the coupler with the connecting member is substantially permanent, and the connecting member has a first section which includes the manifold, here shown with coupler attached, and a second section shown as integrated with the source of pressurized gas. The first and second sections latch together to form a substantially gas tight connection between the source of pressurized gas, and the manifold.

FIG. 14 is a cross-sectional drawing showing a tubular coupler wherein pressurized gas enters a sparger sealed within the inflatable belt at approximately its mid-point. The coupler supplying the gas to the sparger is structurally a continuation of the belt, since the belt is attached to the coupler. A variety of methods may be used for fastening or latching the tubular coupler to the connecting member, and providing communication with the gas source. One connecting latching member is shown in cross section, cooperating with a conical section of the coupler. If desired, the latching member may be attached directly to the source of pressurized gas.

FIG. 15 is a perspective break-away drawing of the connecting latching member of FIG. 14, showing a portion of the conduit to the sparger in latching engagement therewith.

FIG. 16 is a perspective drawing of the latching member of FIGS. 13 and 14, integrated with a source of pressurized gas. Release of the coupler and the belt attached thereto is accomplished by downward pressure of the upwardly biased knurled ring.

Figure 17:
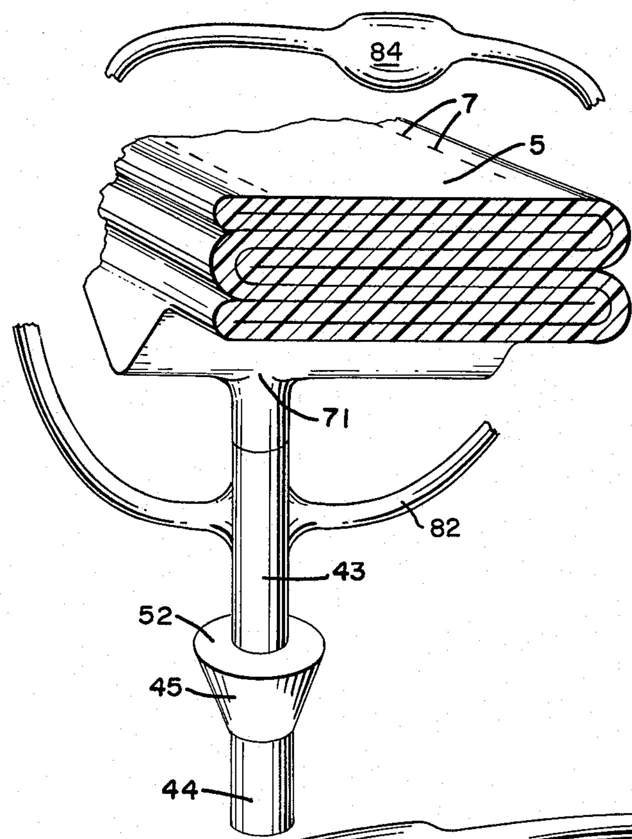

FIG. 17 is a perspective drawing, illustrating the manner in which the sparger of the coupler of FIG. 14 is attached to an inflatable seat belt, being sealed into a pliant nipple which is itself sealed into the inflatable belt. In the case of the folded belt, the nipple passes through the lower single layer, much as a valve stem enters a folded automobile inner tube. The thickness of the belt which is folded longitudinally into a W fold, and preferably stitched with "rotten" thread, is exaggerated for clarity in the illustration.

Figure 18:
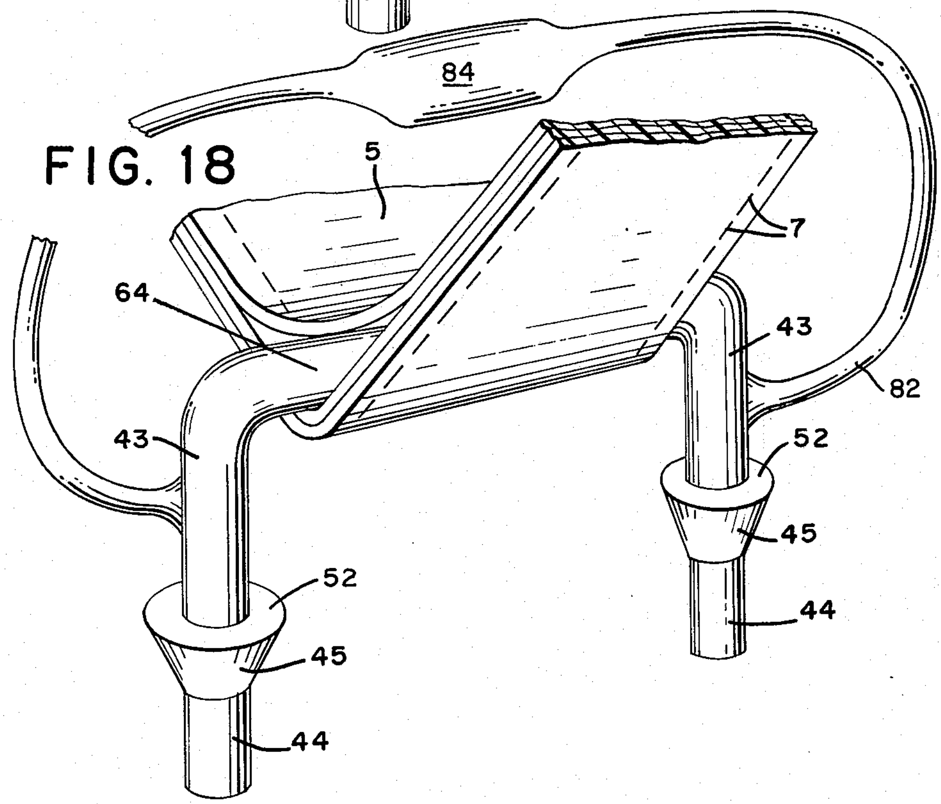

FIG. 18 illustrates still another modification wherein the coupler with sparger is open at both ends, each of which is in communication with the source of pressurized gas. Attachment of the coupler to the inflatable belt is achieved in a manner similar to that depicted in either FIG. 3 or FIGS. 8 and 9. A double latching member is required, constructed in a manner similar to the single unit of FIGS. 14 and 15, except that both conduits would preferably be combined by a manifold for communication with a single source of pressurized gas.

Referring now to FIG. 1 which illustrates one embodiment of the present invention, numeral 1 is a tubular coupling member or coupler having a smooth inner bore 2, which may be either cylindrical or preferably slightly tapered. Nipple 3, elongated in the direction parallel to the tube, communicates with the interior of the tube and is adapted for attachment to an inflatable seat belt or to a conduit for conducting pressurized gas to an inflatable seat belt. Preferably, the entrance to the tube is outwardly flared at 4, to increase the ease with which the tube may be slipped over the rigid cooperating manifold of the connecting member. Where the tubular coupler is tapered, the flare is placed at the end having the greater diameter. This coupler may be fabricated of metal, polyvinyl chloride, polypropylene, nylon, Teflon, or one of a variety of polymers, copolymers or other suitable substances.

Figure 2:
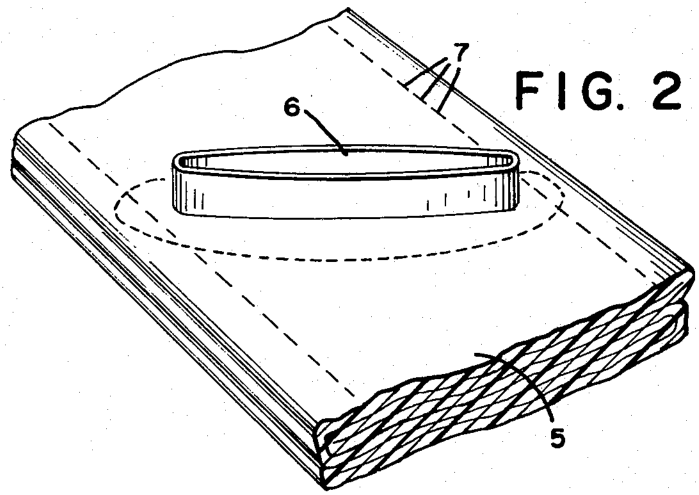

FIG. 2 is a section of folded inflatable belt 5 having a flexible elongated nipple 6 sealed through an opening in the belt, said flexible nipple being adapted for sealed, gas-tight attachment to the rigid nipple 3 of the coupler of FIG. 1 so that pressurized gas entering the coupler will inflate the belt. Various means may be used for retaining the belt in its normally folded uninflated condition. As shown, it is sewn with rotten thread 7 which will break away when pressurized gas in introduced into the belt. The nipple 6 is shown attached at an odd angle with respect to the belt. Actually, as a leg of belting to one side of the nipple may be used as a lap belt, and the leg at the other side of the nipple may be used as a shoulder or chest belt, the angle is selected so as to direct the legs of belting in the most appropriate direction with respect to each other, and with due consideration for the design of the vehicle within which the belting is employed.

FIG. 3 illustrates the appearance of the safety belt 5 when attached to tubular coupler 1, one leg of belting to be used as a lap belt, and one as a shoulder belt.

FIG. 4 and FIG. 5 depict one embodiment of a cooperating rigid member adapted for accepting a tubular coupler, such as that of FIG. 1, in locking engagement. In response to an impulse from sensing element 8 shown diagrammatically in FIG. 4, pressurized gas is released from container 9 to enter conduit 10 for transmission to openings 12 of manifold 13 from which it issues. When a coupler 1 attached to a seat belt as in FIG. 3 has been slipped over manifold 13 to make a slideable but substantially gas-tight connection, it is locked into position. In the case of the embodiment shown, locking arm 14 pivoting from point 15, swings up as shown. Coupler 1 (FIG. 1) is forced against spring 16 and latching member 17 urged by spring 18 snaps into groove 19 at the tip of manifold 13, thus locking the coupler in place. The gas issuing from the manifold and entering coupler 1 (FIG. 1) is transmitted to the inflatable seat belts.

Sensing element 8 may be responsive to a preselected degree of change of acceleration of the vehicle or of the seat belt or to other selected stimuli characteristic of rapid acceleration, deceleration or crash conditions.

Pressurized gas source 9 may be attached directly to the connecting member as shown or it may be placed at a more distant point and connected to the manifold by conduit means. This pressurized gas released in response to impulse from the sensing element 8, may be produced by pyrotechnic means such as by the discharge of a cartridge or by other devices; it may be compressed gas, the pressure of which has been suddenly increased by heat, as, for example, by the ignition of a pyrotechnic device or by other means; or the pressurized gas may be released by virtue of a combination of any of these.

The inflator-connector is anchored to the vehicle. Numeral 20 indicates a point of attachment. As shown in FIG. 4*a*, the inflator connector may be connected to a seat belt 31 associated with an inertia responsive seat belt retractor 11 which locks the belt in response to a high rate of change of acceleration of the vehicle, the safety belt or both, the retractor being anchored to the vehicle by anchoring means 21.

To release the coupler of this embodiment, lever 22 is depressed against the bias of spring 18 to retract latch 17 from groove 19, whereupon arm 14, which is biased toward the open position by coiled spring 23, reverts to its unlatched open position, FIG. 5. Spring 16, pressing against slideable washer 24, then ejects the tubular coupler and attached seat belt from the manifold 13.

The openings 12 may be in any position on the manifold as long as they communicate with the opening or openings in the tubular coupler. Their size, shape and number is not critical. One opening or multiple openings may be employed as long as their total area, and their effective area of communication, is consistent with the volume of gas to be transmitted within permissible time limits, and as long as their number, shape and position is consistent with the required strength of the unit.

FIG. 6 illustrates a modification of the manifold of FIG. 4 and 5. The numerals employed are common to all three figures. The manifold is tapered to increase the ease of attaching and detaching the coupler, which must, of course, have a corresponding internal taper. The opening 12 differ from those of FIGS. 4 and 5 merely to illustrate the fact that their size, shape and arrangement is not critical, providing they do not significantly weaken the manifold, and as long as they permit an adequate flow of gas to an attached coupler.

FIG. 7 illustrates another embodiment of the inflator-connector which differs from that of FIGS. 4, 5 and 6 in that no arm (FIGS. 4 and 5, numeral 14) is required to latch the coupler into place. In the embodiment shown the coupler has been slipped over push button 32 and onto manifold 13. In sliding over the manifold, the coupler depresses catches 28 which are outwardly biased by spring 27 acting through plunger 30 and linkages swiveling at points 33, 34 and 35. As the catches are depressed within the perimeter of the manifold, they cause plunger 30 to compress spring 27. The coupler is pushed all the way on manifold 13 until its leading end is pressed against slideable washer 24 thereby compressing spring 16. When the end of coupler 1 passes over catches 28, spring 27 acting against plunger 30 and through the linkages, causes the catches 28 to spring outwardly extending beyond the perimeter of the manifold, thereby locking the coupler in place against the action of spring 16 which would otherwise eject it. The seat belt attached to the coupler is now locked in place and is in communication with the source of pressurized gas.

If push button 32 is now depressed, compressing spring 27, the linkages between plunger 30 and the catches cause the catches 28 to withdraw into recesses within the body of the manifold, thereby releasing the coupler for ejection from the manifold by spring 16. The cross-section of the manifold is not critical. It may be oval, rectangular, triangular, etc., as long as it corresponds with the shape chosen for the coupler, to provide a substantially gas-tight connection. Preferably, the manifold should have a circular cross-section so that the coupler can rotate thereon, and preferably it should be tapered as in FIG. 6 for easy engagement, ejection and good seating for substantially gas-tight engagement with the coupler. The coupler shown is of a type wherein the pressurized gas is conducted to the inflatable seat belt by means of channels 25, but any other of the several types of tubular coupler discussed would be applicable. If the manifold is tapered inwardly in the direction of the latching mechanism, the coupler must have a corresponding internal taper.

Threaded connection 26 merely indicates one means of attaching the inflator-connector to the source of pressurized gas. This source may be integrated with the connecting member, or at some distance from it, connected by means of a conduit.

FIGS. 8 and 9 illustrate one way in which a coupler 1, may be attached to an inflatable belt. In FIG. 9 the coupler is attached to the belt shown in its uninflated condition. The belt is arranged in a W fold by stitching 7. This stitching is done with so-called "rotten thread" so that the stitches will readily break away when pressurized gas is introduced through coupling 1. In FIG. 8 the belt has been inflated. In this embodiment, flexible flanged nipples are cemented or sealed through openings in the walls of the belting. Each consists of a pliable annular band or flange 36 for sealed attachment to the belt, and a cylindrical or tapered portion 37 for sealed attachment to coupler 1. The flanges, which are pliable enough so as not to interfere with the folding of the belt are preferably sealed or cemented against the inner surface of the belt, although if desired, they may be sealed against the outside surface. The nipples are preferably molded of a suitable pliable reinforced polymeric material and are shaped for conformity with the sidewall of the belt when in its inflated condition (FIG. 8).

FIG. 10 illustrates two asymmetric nipples 36–37 in position on a coupler 1. The flanges 36 are shaped to substantially conform to the shape of the inflated belt, but are sufficiently pliant so as not to interfere with the folding of the belt to which they are sealed. There are several ways in which such flanges can be attached, for example, one flange can be cast directly on the coupler if the latter is of a polymeric composition. The other flange prior to cementing can be slideable on the coupler with the cylindrical portion either facing towards or away from the opposite flange. Alternately, both nipples can be cemented into the belt, then the coupler inserted, and the cylindrical portion of the nipples sealed to the coupler.

The coupler of FIG. 10 is shown as slightly tapered, hence can be more easily removed from a correspondingly tapered manifold, than if both coupler and manifold were cylindrical.

FIGS. 11 and 12 illustrate a coupler which also serves as a distributor for the pressurized gas. Preferably such a coupler is fabricated of polymeric material, such as polyvinyl chloride or polypropylene. It is also preferable to slip a close fitting metal housing or sleeve 65 over the cylindrical coupler to provide additional strength to the seal, and rigidity to the unit. This sleeve may consist of a cylindrical C tube, which permits the legs of belt to extend through the slot in the tube. The tube can have sufficient flexibility to bring pressure against the seal at the junction of the two legs of belting, and in fact, such a sleeve, if constructed of spring steel or the like, may eliminate the need for an actual seal, providing the belt is molded to produce a cylindrical rather than a drop-shaped opening when the C tube is applied to said belting. FIG. 12 represents a non-inflatable belt which may be used to fabricate the coupler-distributor of FIG. 11. The belting contains longitudinally disposed conduits 38, which are opened to produce channels 25, at the point where they lie within the coupling, and wherein they are in substantial register with the outlets 12 of the manifold to which the coupling is to be latched. With this arrangement the pressurized gas may be transmitted through the conduits for any desired distance to the inflatable belting to which they are attached. To give additional strength to this non-inflatable belting, it is preferably covered with webbing, or contains high strength longitudinally disposed cord, such as nylon, imbedded within.

FIG. 13 illustrates another embodiment of out invention wherein the tubular coupling member 1 is in substantially permanent engagement with the rigid cooperating connecting member of FIG. 13, and said connecting member comprises a detachable first section 70 containing the manifold and a second portion 66 (latching means) which includes the source of gas 9, said second portion being anchored to the vehicle at 62. The latching means are included for locking the first section with the second section, thereby anchoring the complete inflator-connector of FIG. 13 to the vehicle, and coupling the sections of the inflator-connector to permit the flow of gas from the source to the inflatable belt to which the coupling member is attached.

In this figure, the coupler is shown to be that of FIG. 11, but any of the other couplers described may be employed. The source of gas 9 is shown as integrated with the second section of the connecting member although said source may be situated at a distance and connected to the inflator-connector with conduit. A coupling device 66 is indicated. One of several coupling devices may be satisfactorily employed. One satisfactory connector for this purpose is that shown in FIGS. 14, 15 and 16.

In the inflator-connector of FIG. 13, a semi-permanent retaining member 67 is shown, holding coupler 1 in position on the manifold which extends through retaining member 67 to point 68. In operation, conduit 10 is pressed into the opening in coupling device 66 wherein it latches, placing coupler 1 and belting 69 in communication with the source of pressurized gas at 9.

FIGS. 14, 15 and 16 represent still another embodiment, wherein the sparger 13, having openings 12 is closed at both ends. The pressurized gas enters at substantially the mid-point 42. The conduit 43 entering the sparger has sufficient strength to serve as a continuation of the belt structure, and is latched into the source of pressurized gas 9. One satisfactory arrangement for obtaining a strong latch and gas connection is shown in FIGS. 14, 15 and 16. With reference to these figures, the tubular coupler which includes conduit 43, nipple 44 and conical member 45 integrated therewith, is pressed into opening 46 in the latching member of FIGS. 14, 15 and 16. Conical member 45 presses against inwardly biased latches 47 which are forced outwardly against their biasing springs 48. In pressing the conduit home, it enters close-fitting receiving tube 49 and compresses spring 50. When the base of the cone 52 is pressed beneath latches 47, they snap inwardly because of springs 48 to their original position, thus locking the conduit firmly in place, with its nipple 44 in a substantially gas-tight relationship with close-fitting receiving tube 49. The conduit 43 is now in communication with the source of gas 9 at point 56. The gas source 9 may be integrated with the latch mechanism to form a compact unit as in FIG. 16, or it may be at some point removed from the latching mechanism but connected therewith by conduit means. When it is desired to eject the tubular coupler and the inflatable belt attached thereto, it is merely necessary to depress concentric ring 53 against its biasing spring 54. Inwardly projecting shoes 63 on this ring thereupon act on the outwardly extending arms 55 of the latches to cause the latches to rock outwardly and release the cone 52. Coiled spring 50 then acts against nipple 44 to eject the tube from the latching member. As shown, the latches pivot from supports integrated with base 57, and cover plate 58 is attached by screws 59 entering posts 60 which are also integrated with base 57. The complete unit of FIG. 16 can be attached to the vehicle at point 62.

FIG. 17 illustrates the manner in which a coupler with sparger of the design shown in FIG. 14 may be attached to an inflatable belt through a single pliant nipple 71. A distributor-coupler as shown in FIG. 11, but with a central opening devoid of conduits 38 or channels 25, may also be employed. For easier handling of the tubular coupling member shown, a metal structure 82 integrated with conduit 43 may be made to extend upwardly to loosely encircle the inflatable belt, and terminate above the belt in a handle 84 which may be grasped for directing the nipple 44 into the opening in the latching member, FIGS. 14, 15 and 16.

FIG. 18 illustrates a coupler 64 open at both ends and connected at each end with a conduit 43 of the type used in FIG. 17. Connection with the inflatable belt may be in the manner illustrated in FIG. 3 or in FIGS. 8 and 9. A double latching member of a design similar to that employed as a single unit in FIGS. 14, 15 and 16 is desirable, with the double unit preferably served by a single source of pressurized gas. Here again, metal structure 82 forming a stirrup-type handle can advantageously be added to bridge the belt, for ease in guiding the twin unit into its corresponding latching member.

While we have described preferred embodiments of our invention, it will be understood that various modifications and changes can be made in the inflator-connector of our invention without departing from the spirit of this invention or the scope of the following claims.

We claim:

1. A combination vehicle safety harness assembly and inflator-connector comprising:

a. inflatable lap and shoulder belts having one end of both belts interconnected and terminating in a rigid unitary tubular coupling member constructed as a single rigid hollow unit having an inlet opening for the passage of gas, and an outlet connected to the interconnecting seat belts;

b. a rigid cooperating connecting member anchored to the vehicle, having conduit means therethrough, and adapted to accept the tubular coupling member in substantially gas-tight engagement, with the outlet of the conduit means in substantial alignment with the inlet opening of the coupling member, to permit the passage of gas from the connecting member to the coupling member when in engagement therewith;

c. a source of gas in communication with the inlet of the conduit;

d. said tubular coupling member being sized to slip within a portion of the outlet of said rigid connecting member, and having on its tubular structure a point of enlargement for locking engagement with cooperating biased latches in the anchored connecting member, whereby said coupling member may be pressed and locked into communication with said connecting member, and thereby with the source of gas;

e. disengaging means for manual disengagement of the tubular coupling member;

f. sensing means responsive to preselected conditions to initiate the flow of gas through the engaged connecting member and coupling member to simultaneously inflate the interconnecting inflatable belts; and g. said coupling member having connected thereto a rigid structure spanning the belt in its folded condition while leaving sufficient clearance for passage of gas through said belt, said rigid structure having a graspable handle attached thereto to aid a user in guiding the coupling member for engagement with the anchored connecting member.

2. The combination vehicle safety harness assembly of claim 1 wherein the ends of at least one of the two belts not terminating in the coupler member, terminate in a seat belt retractor which locks the belt in response to a high rate of change of acceleration, either of the vehicle, the safety belt, or both.

3. The combination vehicle safety harness assembly of claim 1 wherein the source of pressurized gas is integrated with the rigid cooperating connecting member.

4. The combination vehicle safety harness assembly of claim 1 wherein the two interconnecting safety belts comprise two legs of a single continuous inflatable belt, the point of division being the point of connection of the tubular coupling member with belt.

5. The inflator-connector of claim 1 having biasing means for urging the tubular coupling member toward disengagement when it is pressed into engagement and latched into position, whereby when the coupling member is unlatched by manual action, the coupling member attached to the safety belts is at least partially ejected from its fully engaged position.

6. An inflator connector device for securing an inflatable safety seat belt assembly about an occupant of a vehicle, comprising: a rigid connecting member in communication with a source of pressurized gas, said connecting member being anchored to the vehicle and including a rigid tubular manifold having at least one opening in its sidewall; and a tubular coupling member constructed as a single rigid hollow sleeve sized to slip over the manifold to form a substantially gas tight engagement therewith and having at least one opening in its side-wall to communicate with said opening in said sidewall of said manifold, said coupling member being sealed into the inflatable seat belt so as to position said opening in its sidewall within said belt to provide fixed communication between said coupling member and said belt, whereby when said coupling member is slipped onto said manifold, pressurized gas admitted to said manifold from said connecting member is discharged through said opening in said coupling member and passes simultaneously into a lap and shoulder section of said inflatable safety seat belt.

7. The combination vehicle safety harness and inflator-connector of claim 6 wherein the tubular coupling member is in substantially permanent engagement with the rigid cooperating connecting member, and said connecting member comprises a detachable first section containing the manifold, and a second section including the source of gas, said second section being anchored to the vehicle, and means for locking the first section with the second section, thereby anchoring the complete inflator-connector to the vehicle and coupling the sections of the inflator-connector to permit the flow of gas from the source to the inflatable belt to which the coupling member is attached.

8. The inflator-connector device of claim 6 wherein latching means engage the tubular coupling member when said tubular coupling member is pressed into engagement with the connecting member for engagement therewith, and wherein disengaging means are provided for ready manual disengagement of the tubular coupling member.

9. The inflator-connector device of claim 8 wherein the connecting member includes an arm pivotally arranged for latching to a fixed position on said connecting member, to thereby prevent the coupling member when engaged on the connecting member's manifold from being removed.

10. The inflator-connector device of claim 9 wherein the pivotally arranged arm is biased into the open, unlatched position.

11. The inflator-connector of claim 8 having biasing means for urging the tubular coupling member toward disengagement when it is pressed into engagement and latched into position, whereby when the coupling member is unlatched by manual action, the coupling member attached to the safety belt is at least partially ejected from its fully engaged position.

12. The inflator-connector device of claim 6 wherein the manifold and the coupling member each have a plurality of openings which are in communication when the coupling member is engaged with the manifold.

13. The inflator-connector device of claim 6 wherein the manifold is tapered, having minimum diameter at its distal end and the tubular coupling member is correspondingly tapered to form a substantially gas tight seal when slipped over the manifold for engagement therewith.

14. The inflator-connector of claim 6 wherein the tubular coupling member in fixed communication with the inflatable seat belt expands into a sparger within the belt, comprising a perforate cross member oriented substantially crosswise with respect to the belt.

15. The inflator-connector of claim 6 wherein the tubular coupling member is in fixed communication with the seat belt in the area of the mid-point of said coupling member, at which point it is perforate to function as a gas sparger whereupon and the two ends become dual inlets to the belt, thereby bringing about communication between the source of gas and the inflatable belt.

16. The inflator-connector of claim 15 wherein a rigid structure is attached to the dual coupling member, spanning the belt in its folded condition while leaving sufficient clearance for the passage of gas, said structure constituting or having attached thereto a graspable handle to aid a user in guiding the dual coupler into engagement with its corresponding anchored connector.

17. The inflator-connector device of claim 6 wherein the tubular coupling member has an outwardly flared opening as an aid in the insertion of the manifold, said hollow sleeve being adapted to be sealed into an inflatable seat belt to form a chord in the cross section of the inflated seat belt, and having an opening in the sidewall between the point where it enters and leaves the belt, whereby gas entering the belt from the opening will serve to inflate the belt.

18. The inflator-connector device of claim 17 wherein the hollow sleeve enters and leaves the belt by being sealed to pliant flanged nipples, sealed into corresponding openings in the belt.

19. The inflator-connector device of claim 17 wherein the opening in the sidewall of the coupling member comprises a multiplicity of openings in communication with openings in the sidewall of the manifold.

20. The inflator-connector of claim 17 wherein the hollow sleeve is sealed into the walls of the inflatable belt by virtue of having at least one pliant flange molded directly on the sleeve for sealed attachment about an opening in the sidewall of said belt.

21. A tubular coupling member integrated with a distributor for transmitting and distributing gas, comprising a tubular coupler for engagement with the manifold of a connecting member over which it may be slipped in a substantially gas tight relationship, said coupler having adjacent conduits arranged circularly within its wall, and with said conduits in communication with similar conduits spaced in a longitudinal arrangement within the body of two lengths of belting which form a junction with the tubular coupler in a longitudinal line with respect to the coupler; said coupler having portions of the conduits opened inwardly to form channels in the inner surface, whereby gas delivered to the coupler by means of a manifold with which it is engaged enters the channels and their respective conduits for transmission to sections of inflatable belt attached thereto.

22. The tubular coupler-distributor of claim 21 fabricated from a length of belting having a polymeric chemical composition and continuous adjacent parallel conduits throughout its length, said belting having openings extending from the surface into the conduits within the area formed into the tubular coupler, whereby gas released within the coupler from a close fitting manifold is simultaneously distributed to the extending sections of belt.

23. The tubular coupler-distributor of claim 22 having an open ended metal "C" tube as a housing over the cylindrical portion of the coupler and with the two lengths of belting extending through the longitudinal opening in the C tube, to thus strengthen and maintain the shape of the tubular coupler.

24. The tubular coupler-distributor of claim 22 wherein the belting is strengthened by reinforcement with longitudinally embedded cord.

25. The tubular coupler-distributor of claim 22 wherein the belting is strengthened with fabric.

* * * * *